UNITED STATES PATENT OFFICE.

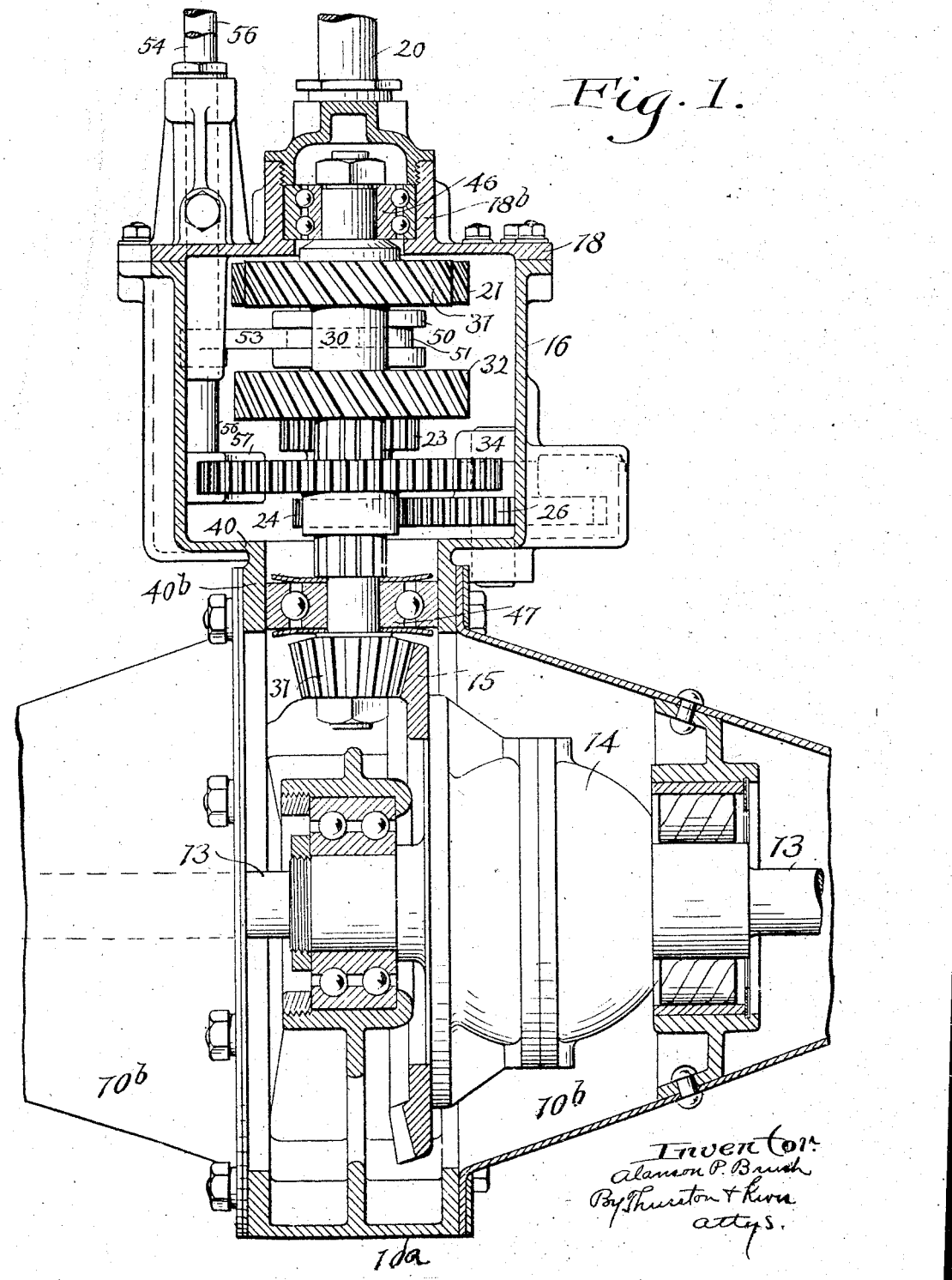

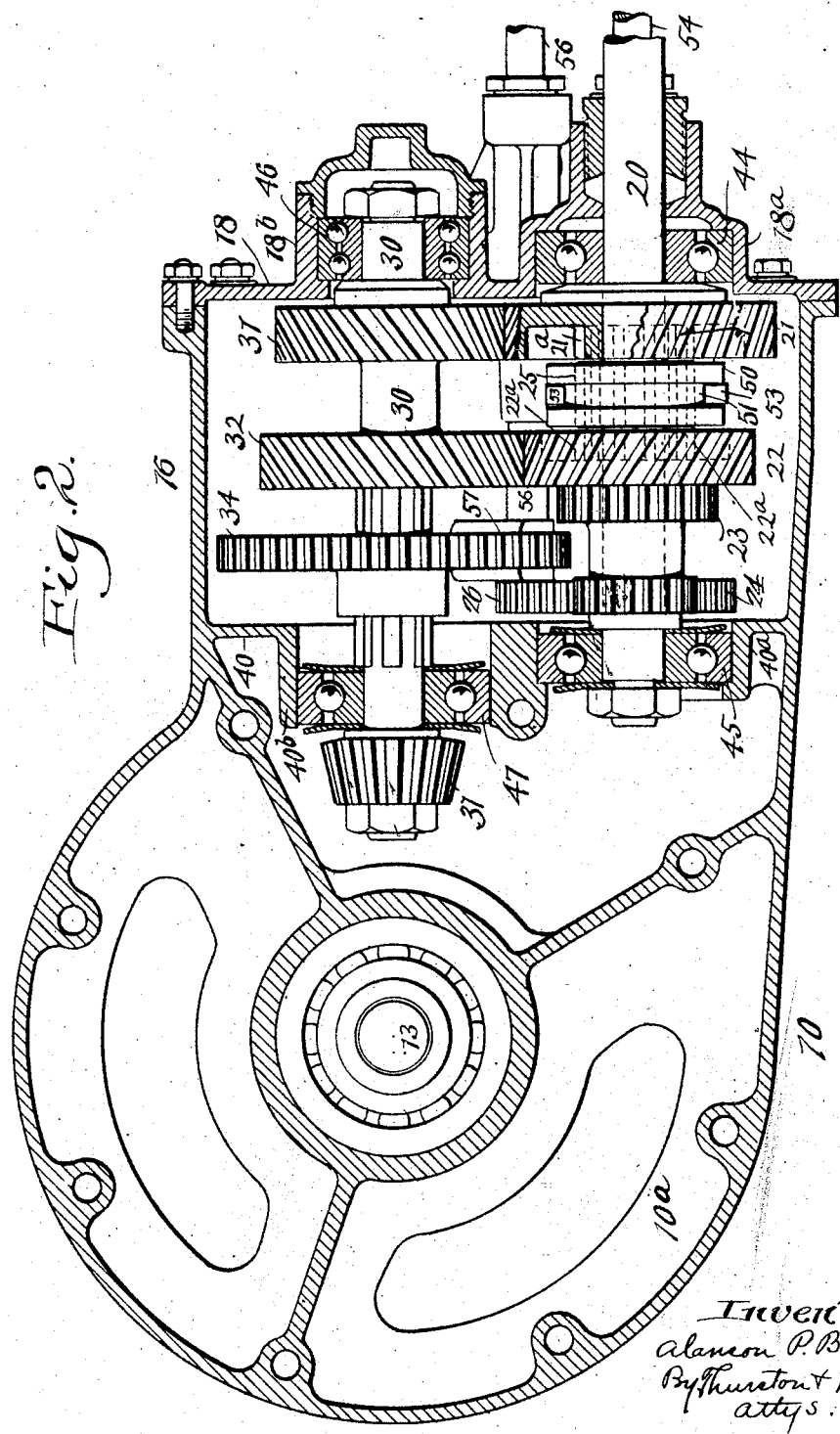

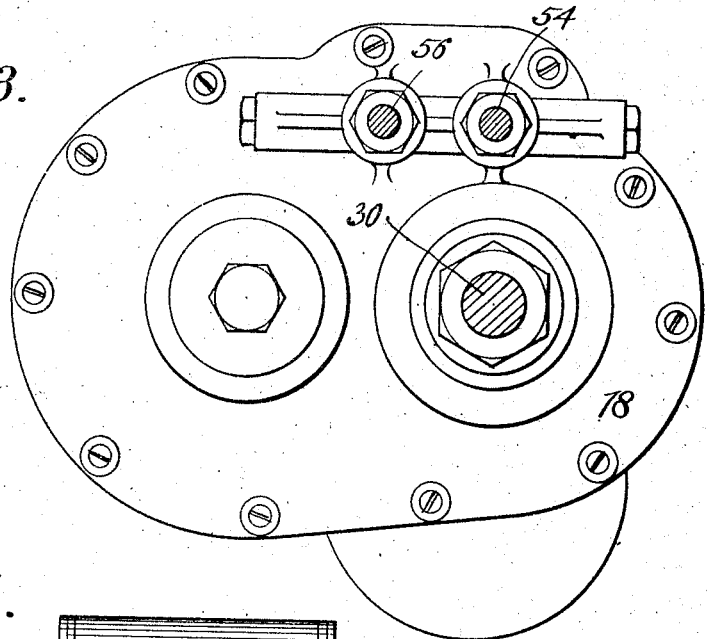
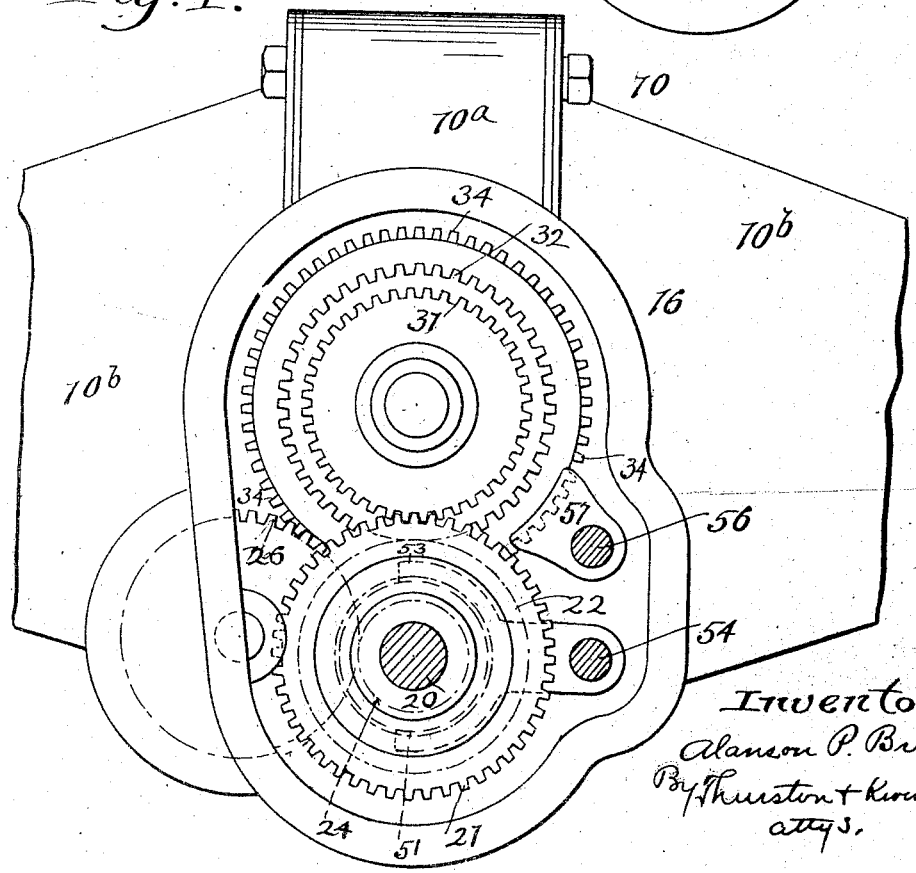

ALANSON P. BRUSH, OF DETROIT, MICHIGAN.

TRANSMISSION MECHANISM FOR AUTOMOBILES.

1,291,391. Specification of Letters Patent. Patented Jan. 14, 1919.

Application filed June 7, 1917. Serial No. 173,259.

*To all whom it may concern:*

Be it known that I, ALANSON P. BRUSH, a citizen of the United States, residing at Detroit, in the county of Wayne and State of Michigan, have invented a certain new and useful Improvement in Transmission Mechanism for Automobiles, of which the following is a full, clear, and exact description.

This invention relates to power transmission mechanism for automobiles; that is to say, to mechanism through which the rotary motion may be transmitted to the driving wheels of the automobile at several speed ratios in one direction or in the reverse direction, as required.

The speed changing part of the transmission mechanism of automobiles which are in common use, provide for one direct drive, which is substantially noiseless, and for several indirect drives, through gear trains, which are noisy and therefore objectionable for continuous driving. Designers of the transmission mechanism for automobiles determine what gear reduction is required as between the engine shaft and driving wheels for the ordinary use of the automobile, having in mind the power output of the engine; and usually the driving pinion and the ring gears of the differential mechanism are made of such relative size as to effect the determined gear reduction when the power is transmitted directly through the change speed gearing instead of through some speed changing gear trains thereof. The gear reduction determined upon and provided for under these conditions is always a compromise such as will impart to the car a wide range on the direct. But obviously gear reduction which will permit a car to travel over bad roads, and up small hills on direct, is too great for higest efficiency on a car which habitually travels over smooth level road surfaces. To meet such conditions of use some automobile builders provide the speed changing gearing with a gear train which increases instead of decreases the gear ratio; but this mechanism is objectionable because noisy.

The chief object of this invention is to provide an automobile with two silent ratio changing mechanisms each suitable for continuous use. Another object is to conveniently group the essential parts of such transmission mechanism, to the end that they may be assembled and disassembled and taken care of generally with ease and at minimum cost.

The invention consists in the construction and combination of parts shown in the drawing, hereinafter described and pointed out definitely in the appended claims.

In the drawings, Figure 1 is a sectional plan view of the transmission mechanism in which the present invention is embodied; Fig. 2 is a sectional side elevation; Fig. 3 is a front end view when the device is turned on its side, and Fig. 4 is a front end view when the cap plate 18 is removed.

Referring to the parts by reference characters, 10 represents the hollow frame member of the rear axle of an automobile. This hollow axle frame member is substantially like that which is shown in my prior Patent No. 1,168,245, in that it is composed of two tubular end members $10^b$, and an intermediate annular member $10^a$, which is located between and is rigidly secured to said end members. The intermediate member $10^a$ is, however, formed with an integral forwardly projecting gear casing 16, the front end of which is closed by a removable plate 18.

Within the hollow axle frame member the differential gearing is mounted in proper relation to the two alined live axle shafts 13. This differential gearing includes a rotary gear housing or drum 14, and suitable gearing therein of well known or any suitable construction for transmitting from said housing to the live axle sections 13 properly differentiated rotary motion. This gear housing is provided with a bevel ring gear 15 by which it may be rotated through the mechanism now to be described.

Within the gear case 16 two shafts 20 and 30 are mounted in parallel relations, and upon suitable anti-friction bearings. Each shaft has two bearings, one carried by the removable plate 18, and one by an integral partition 40, within the casting that forms the member $10^a$ and the gear case 16. This partition 40 is formed with two sleeves $40^a$ and $40^b$, and the plate 18 is formed with two sleeves $18^a$ and $18^b$. The outer ring 44 of the front ring bearing of shaft 20 is fitted within the sleeve $18^a$, and the outer ring 45 of the rear ring bearing of the shaft 20 is fitted in the sleeve $40^a$. The outer ring 46 of the front ring bearing of the shaft 30 is fitted and fixed in the sleeve $18^b$, while the outer ring 47 of the rear ring bearing is slidably fitted within the sleeve 40b. The front end of the shaft 20 projects out of the case 16, through a removable cap plate 18 secured over the front end thereof; and it is to this projecting front end that motion must be transmitted through any appropriate mechanism, of which a great variety is known in this art, from the motor shaft. This shaft 20, therefore, becomes the driving shaft of this transmission mechanism. The shaft 30 is an intermediate shaft, that is to say, it is intermediate of this driving shaft 20 and the differential gear housing 14, which it is provided for turning. The rear end of the shaft 30 projects into the hollow frame member 10 and carries a bevel pinion 31 which is in constant mesh with the bevel ring gear 15.

Two silent spiral gears 31 and 32 are fixed to the shaft 30. These are of different diameters, and they respectively mesh with two similar gears 21, 22, which are rotatably mounted upon the shaft 20 in such positions that they will always be in mesh with the gears 31, 32. Clutch mechanism is provided whereby either of the gears 21, 22, may be clutched to the driving shaft 20; wherefore, the intermediate shaft will be turned, and at high driving speed if it be the gear 21 which is clutched to the shaft 20, or at what is known as low driving speed, if it be the gear 22 which is clutched to shaft 20.

Additionally there is secured to the driving shaft 20 two spur gears 23, 24. A gear 34 is slidably mounted upon the intermediate shaft 30, and has a driving connection therewith, but may be moved endwise along said shaft; and it is of such diameter that it may mesh with gear 23, whereby low speed motion will be transmitted from the driving shaft 20 to the intermediate shaft 30, and thence to the differential gear housing. Or this gear 34, by being moved rearwardly may be moved into mesh with an idler gear 26 which in turn meshes with the gear 24, whereby reverse movement may be transmitted from shaft 20 to the intermediate shaft 30.

The particular clutch mechanism employed comprises a sliding sleeve 50 which is mounted on the driving shaft 20 between the two gears 21 and 22. This sleeve fits upon a longitudinally grooved enlarged part 25 of shaft 20, and the sleeve 50 has tongues which slidably fit the grooves. The hubs 21a, 22a, of the gears 21 and 22 are of the same diameter as the enlarged part 25 of the shaft, and have similar longitudinal grooves therein; wherefore by sliding this clutch sleeve forward it will come into interlocking engagement with the hub of the gear 21, while it remains in interlocking engagement with the shaft 20, whereby the gear 21 will be clutched to the shaft; or it may be moved rearwardly to bring about in a similar manner a similar connection between gear 22 and shaft 20.

This clutch sleeve has an external annular groove 51 which receives the fork arms 53 fixed to an endwise movable clutch operating rod 54 which extends out of the front end of the gear case 16 to a point convenient for the driver to operate it and move it endwise.

Another longitudinally movable rod 56 is provided within the case 16 with a fork 57 that embraces the gear 34 and this rod 56 extends out of the front end of the case 16 to a convenient point for the driver to move the gear 34 forward or backward on shaft 30 as required to bring about the desired results.

Having described my invention, I claim:—

1. In automobile transmission mechanism, the combination of a driving shaft, an intermediate shaft parallel thereto, mechanism constantly operated to transmit motion from said intermediate shaft to the driving wheels of the automobile, a pair of spiral gears of different diameters on the driving shaft, a pair of spiral gears of different diameters on the intermediate shaft constantly in mesh with the spiral gears on the driving shaft, the said spiral gears being fast to one of said shafts and being loosely mounted on the other shaft, means by which to connect either or neither of the last mentioned gears with the shaft upon which they are loosely mounted, two gears fixed to one of said shafts, an idler gear in constant mesh with one of said gears, and a gear slidably mounted upon the other shaft and having a driving connection therewith and adapted to be moved into and out of engagement with one of the last mentioned gears fixed to the shaft on which it is mounted or with the said idler gears.

2. In automobile transmission mechanism, the combination of a hollow axle frame member, differential gearing rotatably mounted therein, a casing fixed to and projecting forward from said axle frame member, a driving shaft rotatably mounted in said casing on an axis at right angles to that of the differential gearing within the hollow axle frame member,—which driving shaft projects forward out of the front end of said casing, an intermediate shaft parallel with said driving shaft rotatably mounted within the said casing and projecting rearwardly therefrom into the hollow axle frame member, intermeshing gears secured respectively to the rear end of said intermediate shaft and to said differential gearing, a plurality of spiral gears upon the driving and intermediate shafts in constant mesh, the gears on one of said shafts being loosely mounted, and means to lock any one of those loosely mounted gears to the shaft on which it is mounted and at the same time disengage the other loosely mounted gear from said shaft.

3. In automobile transmission mechanism, the combination of a hollow axle frame member having differential gearing rotatably mounted therein, a casing fixed to and projecting forward from said axle frame member, a driving shaft rotatably mounted in said casing in an axis at right angles to that of the differential gearing within the hollow axle frame member, which driving shaft projects forward out of the front end of said casing, an intermediate shaft parallel with said driving shaft rotatably mounted within the said casing and projecting rearwardly therefrom into the hollow axle frame member, intermeshing gears secured respectively to the rear end of said intermediate shaft and to said differential gearing, a plurality of spiral gears upon the driving and intermediate shafts in constant mesh, the gears on one of said shafts being loosely mounted, and means to lock any one of those loosely mounted gears to the shaft on which it is mounted and at the same time disengage the other loosely mounted gears from said shaft, a gear fixed to the shaft on which are the loosely mounted gears, a gear slidably mounted on the other shaft and having a driving connection therewith, and means to move said last mentioned gear lengthwise of the shaft on which it is mounted into and out of mesh with the gear fixed to the other shaft.

4. In automobile transmission mechanism, the combination of a hollow axle frame member, a transmission gear case fixed to and projecting forward therefrom, a cap plate secured to the front end of said casing to close the same, there being a transverse partition within the rear end of said gear casing, a driving shaft which lies for most part within said gear casing and projects forward therefrom through said cap plate, anti-friction bearings for said shaft supported on said cap plate and on said partition, an intermediate shaft parallel with the driving shaft and lying for most part within said gear casing but projecting rearwardly therefrom into the hollow axle frame member, anti-friction bearings for said intermediate shaft supported on the front cap plate and on said partition, constantly meshing gears within said hollow axle frame member fixed respectively to the rear end of said intermediate shaft and to said differential gearing, a plurality of gears upon the driving shaft within said gear casing, an equal number of constantly meshing gears within said casing upon the intermediate shaft, the gears on one of the shafts being loosely mounted and the gears upon the other shaft being fixed to said shaft, and means to lock any one of these loosely mounted gears to the shaft on which it is mounted.

5. In automobile transmission mechanism, the combination of a hollow axle frame member, a transmission gear casing fixed to and projecting forwardly therefrom, there being across said casing at its rear end a transverse partition, a cap plate secured to the front end of said casing to close the same, a driving shaft which is located for most part within said gear casing but which projects out therefrom through the cap plate thereof, said shaft being rotatably mounted in anti-friction bearings which are supported on said partition and on said cap plate respectively, an intermediate shaft located for most part within said casing and projecting rearwardly therefrom into the hollow axle frame member, anti-friction bearings for said shaft which are supported on the cap plate and on said partition, a pair of spiral gears of different diameters upon the intermediate shaft, a pair of constantly meshing spiral gears upon the driving shaft, the said gears upon one of said shafts being loosely mounted and the gears upon the other of said shafts being fixed thereto, clutch mechanism adapted to connect either or neither of said loosely mounted gears with the shaft upon which they are mounted, two gears fixed to the shaft on which said gears are loosely mounted, an idler gear in constant mesh with one of said fixed gears, a gear slidably mounted upon the other shaft and having a driving connection therewith and adapted to mesh with said idler gear or with the fixed gear with which the idler gear does not mesh or to be moved out of mesh with either, means for operating said clutch, means for sliding said sliding gear, differential mechanism mounted within the hollow axle frame member, a gear secured thereto, another gear secured to the rear end of the intermediate shaft in constant mesh therewith.

In testimony whereof, I hereunto affix my signature.

ALANSON P. BRUSH.